(12) United States Patent
Kohara

(10) Patent No.: US 7,126,514 B2
(45) Date of Patent: Oct. 24, 2006

(54) INVERTER CONTROL DEVICE AND INVERTER CONTROL METHOD

(75) Inventor: Masaru Kohara, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 186 days.

(21) Appl. No.: 11/006,745

(22) Filed: Dec. 8, 2004

(65) Prior Publication Data

US 2005/0134494 A1    Jun. 23, 2005

(30) Foreign Application Priority Data

Dec. 9, 2003    (JP) ............................. 2003-410493

(51) Int. Cl.
*H03M 1/00* (2006.01)
(52) U.S. Cl. ................ 341/141; 341/116; 341/117
(58) Field of Classification Search ................ 341/141, 341/112, 116, 117; 318/715, 721, 2
See application file for complete search history.

(56) References Cited

U.S. PATENT DOCUMENTS

| 4,713,596 | A | | 12/1987 | Bose |
| 5,349,351 | A | * | 9/1994 | Obara et al. ................ 341/141 |
| 5,537,113 | A | * | 7/1996 | Kawabata .................... 341/141 |
| 5,894,736 | A | * | 4/1999 | Beaverson et al. ........... 62/230 |
| 5,969,496 | A | * | 10/1999 | Yamada et al. ............. 318/715 |
| 6,060,859 | A | * | 5/2000 | Jonokuchi .................... 318/801 |
| 6,172,629 | B1 | * | 1/2001 | Fetterman .................... 341/131 |
| 6,198,240 | B1 | * | 3/2001 | Notohara et al. ........... 318/268 |
| 6,246,192 | B1 | * | 6/2001 | Haass ........................ 318/112 |
| 6,573,849 | B1 | * | 6/2003 | Kohara et al. ............... 341/141 |
| 6,639,810 | B1 | * | 10/2003 | Shimizu et al. ............... 363/16 |
| 6,661,364 | B1 | | 12/2003 | Kohara et al. |
| 6,707,406 | B1 | | 3/2004 | Kohara et al. |
| 6,788,240 | B1 | * | 9/2004 | Reyneri et al. ............. 341/159 |

FOREIGN PATENT DOCUMENTS

| JP | 2002-165476 | | 6/2002 |
| JP | 2002-165476 | * | 7/2002 |

* cited by examiner

*Primary Examiner*—Linh Van Nguyen
(74) *Attorney, Agent, or Firm*—McDermott Will & Emery LLP

(57) ABSTRACT

An inverter control microcomputer 10 comprises AD converters 21–23, a selector control circuit 31, and a selector 32. The selector 32 selects three analog signals from among inputted seven analog signals in accordance with control from the selector control circuit 31. A control signal generation section, which comprises a CPU 11 and an inverter control signal generation circuit 17, generates a motor control signal Cntl based on three digital values obtained by the respective AD converters 21–23. By performing AD conversion concurrently for arbitrary three analog signals, it is possible to eliminate a phase shift between the detected analog signals and perform motor control with high precision. Thus, it is possible to detect an analog signal necessary for control of a motor, etc., at an appropriate timing without increasing the number of AD converters.

50 Claims, 11 Drawing Sheets

F I G. 1
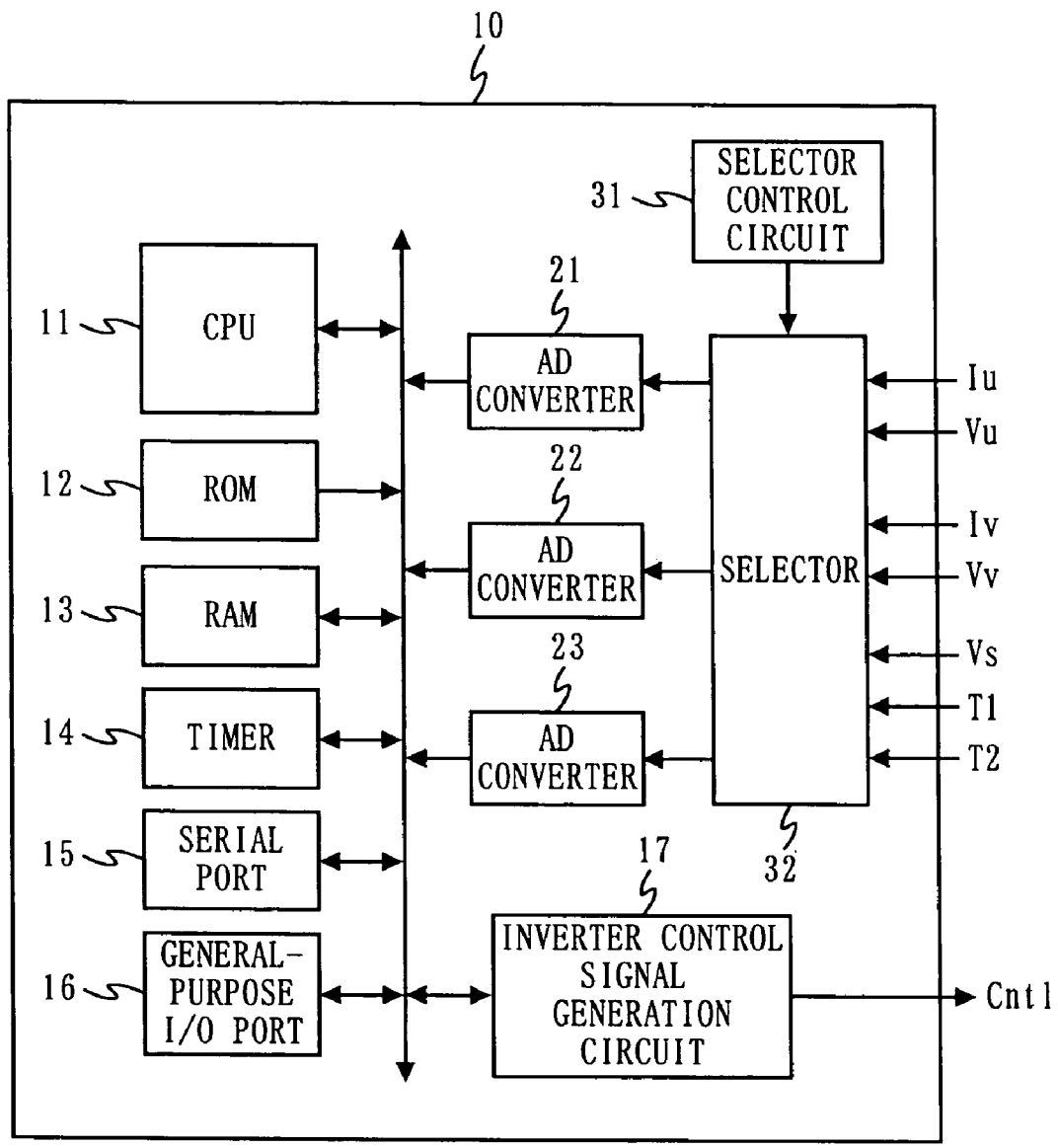

INVERTER CONTROL DEVICE AND INVERTER CONTROL METHOD

BACKGROUND OF THE INVENTION

1. Field of the Invention

The present invention relates to an inverter control device incorporating an AD converter, and an inverter control method.

2. Description of the Background Art

FIGS. 15A and 15B are illustrations each showing a configuration of a conventional inverter control microcomputer. An inverter control microcomputer 101 as shown in FIG. 15A includes a CPU 11, a ROM 12, a RAM 13, a timer 14, a serial port 15, a general-purpose I/O port 16, an inverter control signal generation circuit 17, and an AD converter 121. The inverter control microcomputer 101 is used as an element incorporated in a motor control device, which will be described below (see FIG. 2).

Conventionally, in order to conserve energy, a method for converting a position detection signal (analog signal) to a digital value by the AD converter incorporated in the inverter control microcomputer is adopted in the motor control device. In this method, an analog position detection signal is inputted to the inverter control microcomputer, and the AD converter incorporated in the inverter control microcomputer converts the inputted analog signal to a digital value. Next, the CPU incorporated in the inverter control microcomputer calculates a position of the rotor of the motor based on the obtained digital value. Next, the inverter control signal generation circuit incorporated in the inverter control microcomputer generates a motor control signal based on the obtained position information. The motor is controlled by the control signal generated as described above.

Here, in the case where a three-phase motor is used, it is preferable that two analog signals be used as position detection signals. However, the inverter control microcomputer 101 as shown in FIG. 15A has only one AD converter 121, whereby AD conversion cannot be performed concurrently for two analog signals. As a result, in the inverter control microcomputer 101, two analog signals are detected at slightly shifted time points. However, if there is a time lag between detection times of two analog signals, it is impossible to perform high-precision motor control because the motor is always running.

In order to solve the above-described problem, as shown in FIG. 15B, an inverter control microcomputer 102 having two AD converters 121 and 122 has been put into practical use. The inverter control microcomputer 102 can perform AD conversion concurrently for two-phase current values (U-phase motor current Iu and V-phase motor current Iv). Thus, it is possible to perform motor control with high precision.

Also, along with the enforcement of amendments to the Laws concerning the Rational Use of Energy and regulations on mains harmonics, a method for performing motor inverter control using a factor other than two-phase current values has been studied. Specifically, a method for enhancing the efficiency of motor inverter control by detecting a motor voltage and a power supply voltage in addition to motor currents has been studied. The Applicant of the present application has already proposed a semiconductor device for performing inverter control provided with more than two AD converters in Japanese Laid-Open Patent Publication No. 2002-165476 gazette.

For example, assume that the semiconductor device as described in the above gazette is used for detecting two-phase motor currents (U-phase motor current Iu and V-phase motor current Iv) and two-phase motor voltages (U-phase motor voltage Vu and V-phase motor voltage Vv). In this case, as shown in FIG. 16, by performing analog signal selection using two multiplexers 131 and 132 for selecting one output signal from among two input signals, it is possible to concurrently detect two-phase motor currents or two-phase motor voltages. However, the AD converters 121 and 122 need a predetermined time to perform AD conversion. Thus, in the configuration as shown in FIG. 16, it is impossible, for example, to concurrently detect the U-phase motor current Iu and the U-phase motor voltage Vu, and it is necessary to detect the U-phase motor voltage Vu after detecting the U-phase motor current Iu.

The easiest method of solving the above problem is to incorporate more AD converters into the inverter control microcomputer. For example, as shown in FIG. 17, it is possible to perform AD conversion concurrently for two-phase motor currents and two-phase motor voltages by separately inputting the two-phase motor currents and the two-phase motor voltages to different AD converters 121 to 124 via respective multiplexers 133 to 136. However, the configuration as shown in FIG. 17 has a drawback in that a cost of the inverter control microcomputer is increased with an increase in the number of AD converters.

SUMMARY OF THE INVENTION

Therefore, an object of the present invention is to provide an inverter control device and an inverter control method which are capable of detecting an analog signal necessary for control of a motor, etc., at an appropriate timing.

The present invention has the following features to attain the object mentioned above.

The inverter control device of the present invention comprises a selection section for selecting N (N is an integer equal to or greater than three and smaller than M; M is an integer equal to or greater than four) analog signals from among inputted M analog signals, N AD converters for converting the N analog signals selected by the selection section to N digital values, and a control signal generation section for generating a control signal for an object to be controlled based on the N digital values obtained by the N AD converters.

In this case, the selection section may select arbitrary N analog signals from among the M analog signals. Alternatively, L (L is an integer smaller than N) analog signals included in the N analog signals may be previously chosen for each of the M analog signals, and the selection section may output each of the M analog signals as any of the analog signals which are previously chosen for each of the M analog signals.

The inverter control device of the present invention may further comprise a selection control section for controlling analog signal selection performed by the selection section. The selection control section may change analog signal selection performed by the selection section in accordance with an instruction outputted from a CPU included in the control signal generation section or a timer interrupt which occurs at a predetermined cycle. Also, the selection control section may change analog signal selection performed by the selection section in accordance with a digital value obtained by at least one AD converter of the N AD converters. More preferably, the selection control section may compare the above digital value with a previously determined threshold value, and change analog signal selection performed by the selection section based on the comparison results.

Also, the selection control section may change analog signal selection performed by the selection section while the object is controlled. Alternatively, the selection control section may change analog signal selection performed by the selection section based on device type information before the object is controlled.

Also, in the case where the M analog signals include two-phase currents and two-phase voltages, the selection control section may switch analog signal selection performed by the selection section between a mode in which two-phase currents are outputted to different AD converters and a mode in which one-phase current and one-phase voltage are outputted to different AD converters. In this case, the selection control section may switch analog signal selection performed by the selection section between the above two modes based on a periodic signal which occurs at a predetermined cycle. Alternatively, the selection control section may switch analog signal selection performed by the selection section between the above two modes in accordance with a digital value obtained by at least one AD converter of the N AD converters. More preferably, the selection control section may compare the above digital value with a previously determined threshold value, and switch analog signal selection performed by the selection section between the above two modes based on the comparison results.

Alternatively, performance of at least one AD converter of the N AD converters may be different from performance of other AD converters, or may be lower than performance of other AD converters. In the case where the M analog signals include a load current, the selection control section may switch analog signal selection performed by the selection section between a mode in which the load current is outputted to a relatively high-performance AD converter and signals other than the load current are outputted to a relatively low-performance AD converter, and a mode in which a part of the signals other than the load signal is outputted to the relatively high-performance AD converter and another part of the signals other than the load current is outputted to the relatively low-performance AD converter. More preferably, the selection control section may switch analog signal selection performed by the selection section to the former mode when the object is controlled, and otherwise to the latter mode.

An inverter control method of the present invention comprises the steps of selecting N (N is an integer equal to or greater than three and smaller than M; M is an integer equal to or greater than four) analog signals from among inputted M analog signals, AD-converting the selected N analog signals to N digital values, and generating a control signal for an object to be controlled based on the obtained N digital values. The inverter control method of the present invention further includes an inverter control method of the above-described inverter control device of the present invention.

According to the inverter control device and inverter control method of the present invention, it is possible to cause the selection section (or the selecting step) to select a plurality of analog signals for which AD conversion is performed. Thus, it is possible to perform AD conversion concurrently for the plurality of analog signals, as required. As a result, it is possible to perform high-precision control for an object to be controlled (e.g., a motor) for which control should be performed while switching an input signal without increasing the number of AD converters incorporated therein. For example, in the case where the inverter control device and the inverter control method of the present invention are applied to motor control, it is possible to provide a device achieving required energy conservation.

Also, by using the above-described selection control section (or the selection controlling step), it is possible to switch signal selection performed by the selection section (or the selecting step) in accordance with each timing without increasing a software processing load on the CPU.

Also, by using AD converters of varying performance, it is possible to select an AD converter most suitable for an inputted analog signal. Thus, it is possible to perform high-precision AD conversion without increasing costs.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration showing a configuration of an inverter control microcomputer according to a first embodiment of the present invention;

DESCRIPTION OF THE PREFERRED EMBODIMENTS

First Embodiment

Figure 2:
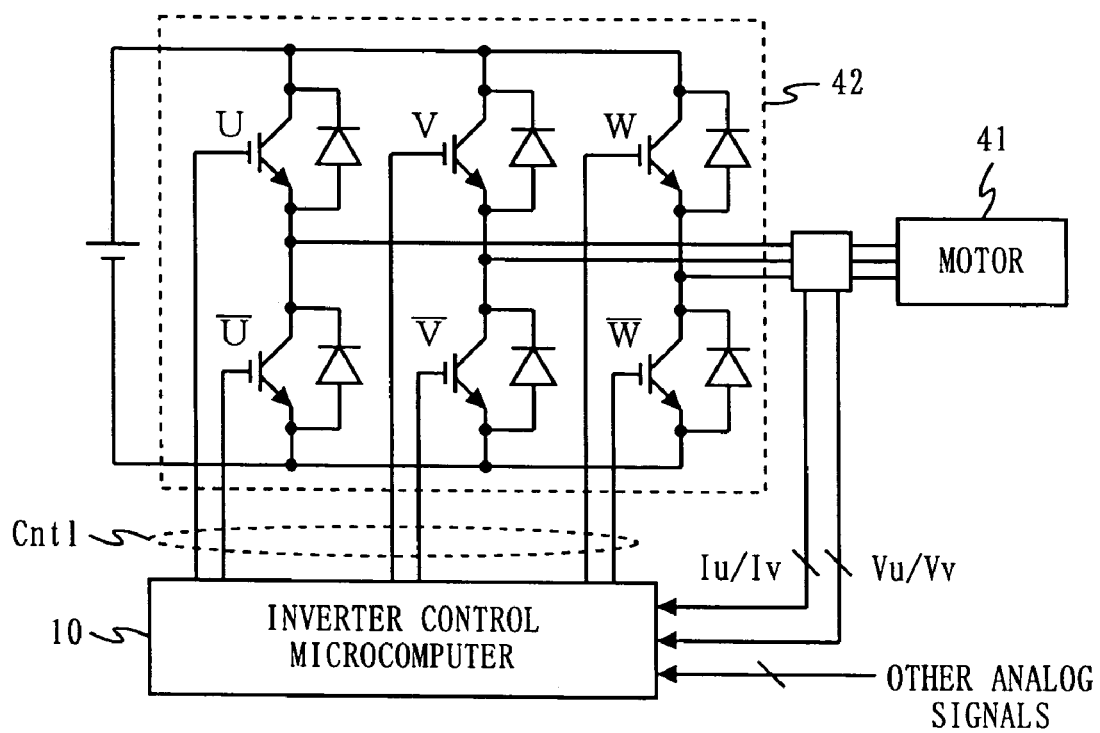
FIG. 2 is an illustration showing a configuration of a motor control device incorporating the inverter control microcomputer as shown in FIG. 1.

FIG. 1 is an illustration showing a configuration of an inverter control microcomputer according to a first embodiment of the present invention. The inverter control microcomputer 10 as shown in FIG. 1 includes a CPU 10, a ROM 12, a RAM 13, a timer 14, a serial port 15, a general-purpose I/O port 16, an inverter control signal generation circuit 17, three AD converters 21 to 23, a selector control circuit 31, and a selector 32.

The inverter control microcomputer 10 is used as an element incorporated in a motor control device. FIG. 2 is an illustration showing a configuration of the motor control device incorporating the inverter control microcomputer 10. In FIG. 2, inverter control of a motor 41 is performed using the inverter control microcomputer 10. Two-phase motor currents (U-phase motor current Iu and V-phase motor current Iv) and two-phase motor voltages (U-phase motor voltage Vu and V-phase motor voltage Vv) are inputted to the inverter control microcomputer 10 as analog signals as information indicating a state of the motor 41. Also, other than the above-described two-phase motor currents and two-phase motor voltages, a power supply voltage and temperature sensor outputs are inputted to the inverter control microcomputer 10 as analog signals. The inverter control microcomputer 10 converts the inputted analog signals to digital values, and generates a motor control signal Cntl based on the obtained digital values. The motor control signal Cntl is amplified by a motor drive circuit 42 to a predetermined level, and supplied to the motor 41.

The AD converters 21 to 23 separately convert the inputted analog signal to a digital value. Thus, the inverter control microcomputer 10 can perform AD conversion concurrently for up to three analog signals. AD converters having the same performance are used as the AD converters 21 and 22, whereas an AD converter having a lower performance compared to the above AD converters 21 and 22 is used as the AD converter 23. For example, relatively high-speed and high-resolution AD converters whose conversion speed is 1.5 microseconds and resolution is 10 bits are used as the AD converters 21 and 22, whereas a relatively low-speed and low-resolution AD converter whose conversion speed is 5 microseconds and resolution is 8 bits is used as the AD converter 23.

The CPU 11, the ROM 12, the RAM 13, and the inverter control signal generation circuit 17 cooperatively perform a predetermined signal process for the digital values obtained by the AD converters 21 to 23, and function as a control signal generation section for generating a motor control signal Cntl.

As shown in FIG. 1, seven analog signals (a U-phase motor current Iu, a U-phase motor voltage Vu, a V-phase motor current Iv, a V-phase motor voltage Vv, a power supply voltage Vs, a first temperature sensor output T1, and a second temperature sensor output T2) are inputted to the inverter control microcomputer 10. These seven analog signals are inputted to the AD converters 21 to 23 via the selector 32. The selector 32 selects arbitrary three analog signals from among the inputted seven analog signals in accordance with the control from the selector control circuit 31. The three analog signals selected by the selector 32 are inputted to the AD converters 21 to 23, respectively.

Figure 3:
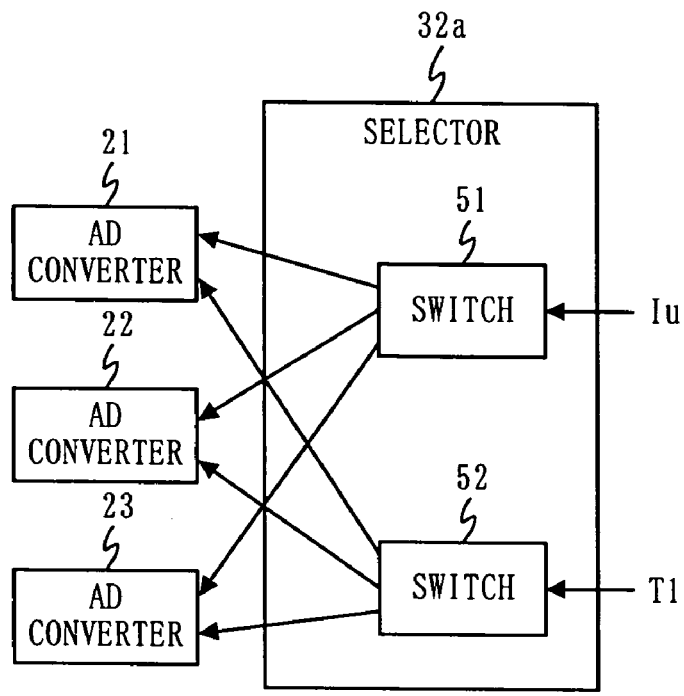
FIG. 3 is an illustration showing a detailed configuration (first configuration) of a selector included in the inverter control microcomputer as shown in FIG. 1.

FIG. 3 is an illustration showing a detailed configuration of the selector 32. A selector 32a as shown in FIG. 3 includes seven switches corresponding to the seven input signals. Each switch, which is connected to the three AD converters 21 to 23, is controlled so as to out put the input signal to the AD converter 21, output to the AD converter 22, output to the AD converter 23, or output no signal to any of the three AD converters. Note that, for simplification of the drawing, only a switch 51 for switching an output destination of the U-phase motor current Iu and a switch 52 for switching an output destination of the first temperature sensor output T1 are shown in FIG. 3, and other five switches are omitted. By using the above-described selector 32a, it is possible to select arbitrary three analog signals from among the inputted seven analog signals.

Figure 4:
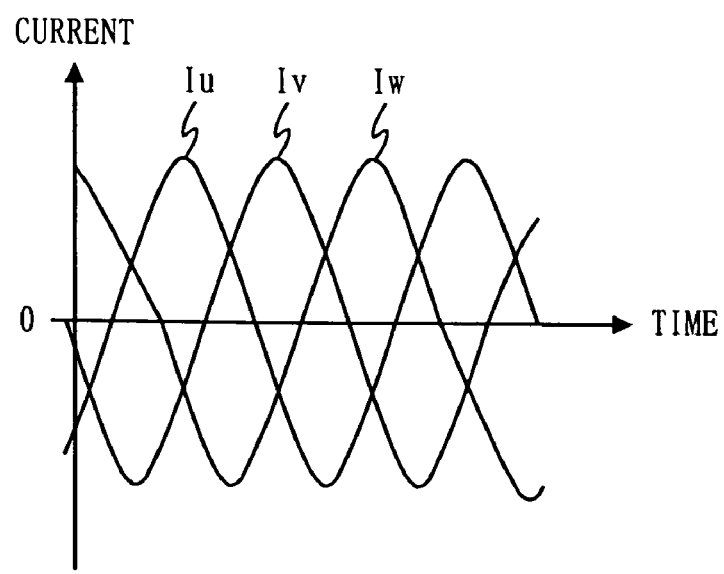
FIG. 4 is a current waveform diagram of a three-phase motor.

FIG. 4 is a current waveform diagram of a three-phase motor. As shown in FIG. 4, the sum of three-phase motor currents (a U-phase motor current Iu, a V-phase motor current Iv, and a W-phase motor current Iw) is always zero by Kirchhoff's law. Thus, for example, by detecting the U-phase motor current Iu and the V-phase motor current Iv, it is possible to obtain the W-phase motor current Iw by calculation. Also, after obtaining the three-phase motor currents, it is possible to obtain a position of the rotator of the motor 41 by calculation.

Figure 5:
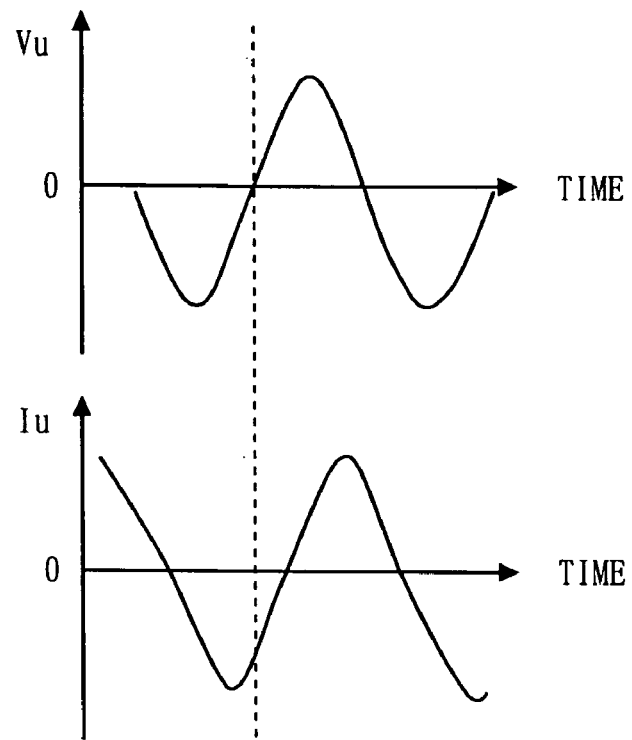
FIG. 5 shows waveform diagrams of a U-phase motor voltage and a U-phase motor current.

FIG. 5 shows wave form diagrams of a U-phase motor voltage and a U-phase motor current. As shown in FIG. 5, a load on the motor 41, for example, causes a phase shift between the U-phase motor voltage Vu and the U-phase motor current Iu. Thus, it is possible to estimate a loaded condition, etc., of the motor 41 based on the phase shift between the U-phase motor voltage Vu and the U-phase motor current Iu. Note that it is possible to estimate a loaded condition of the motor 41 in a similar manner by detecting a phase shift between a V-phase motor voltage Vv and a V-phase motor current Iv, or a phase shift between a W-phase motor voltage Vw and a W-phase motor current Iw.

Figure 6:
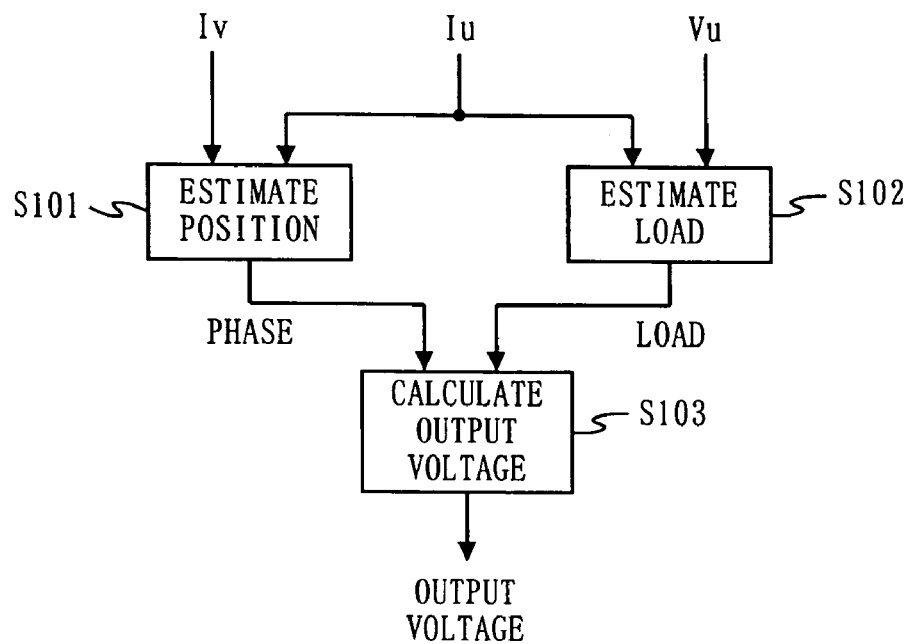
FIG. 6 is an illustration showing a motor control algorithm of the inverter control microcomputer as shown in FIG. 1.

Based on the above description, it is possible to construct a motor control algorithm as shown in FIG. 6, for example. In the algorithm as shown in FIG. 6, a position (i.e., phase) of the rotator of the motor 41 is first estimated based on the U-phase motor current Iu and the V-phase motor current Iv (step S101). Next, a load on the motor 41 is estimated based on the U-phase motor current Iu and the U-phase motor voltage Vu (step S102). Finally, an output voltage (i.e., a voltage to be applied to the motor 41) is calculated based on the estimated position and load (step S103). The CPU 11 executes a program stored in the ROM 12, thereby executing the algorithm as shown in FIG. 6 according to a predetermined cycle (typically, every carrier cycle). The inverter control signal generation circuit 17 generates the motor control signal Cntl based on the output voltage obtained by the CPU 11. As such, it is possible to perform inverter control of the motor 41.

Figure 7A:
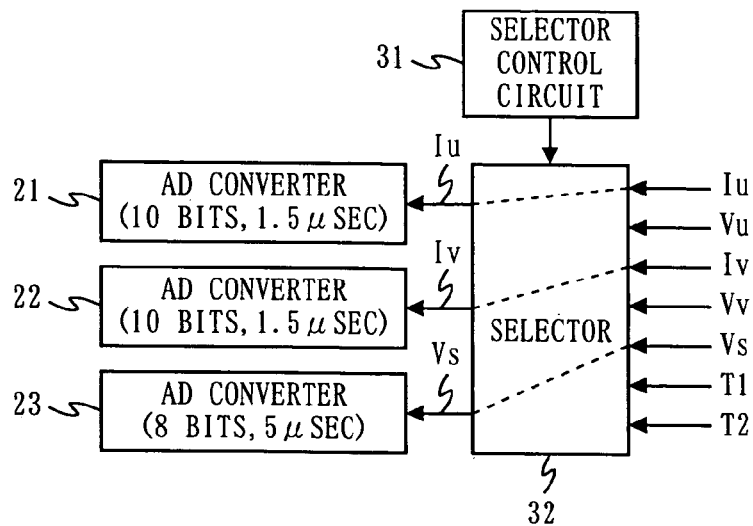
FIGS. 7A to 7C are illustrations showing an operation of the selector included in the inverter control microcomputer as shown in FIG. 1.
Figure 7B:
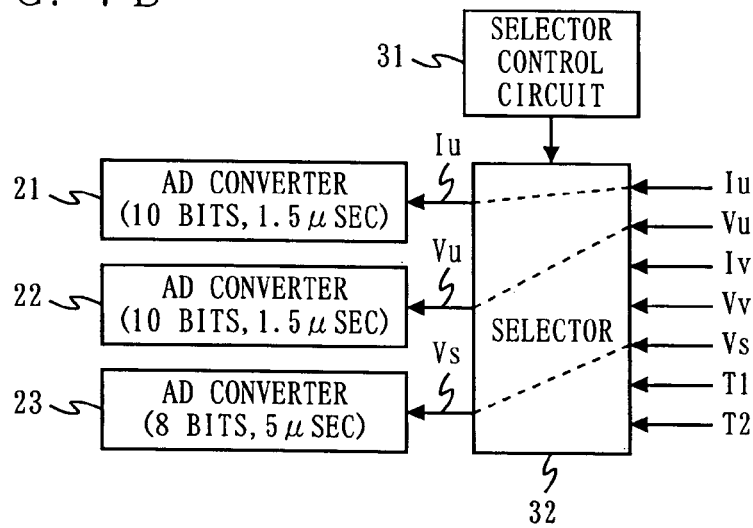
Figure 7C:
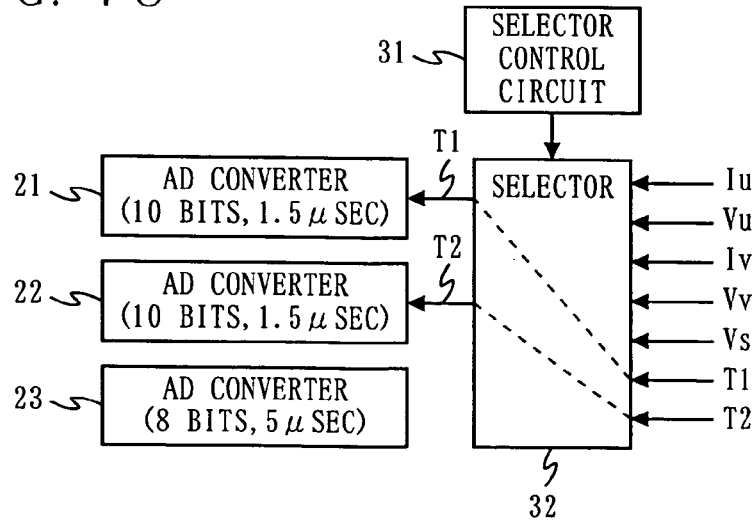

FIGS. 7A to 7C are illustrations showing an operation of the selector 32. As described above, the selector 32 selects arbitrary three analog signals from among the inputted seven analog signals in accordance with the control from the selector control circuit 31. The CPU 11 performs the algorithm as shown in FIG. 6 every carrier cycle, whereby the carrier cycle is divided into two parts: the first half and the last half. In the first half of the carrier cycle, the selector 32 selects three analog signals from among the inputted seven analog signals in a manner as shown in FIG. 7A. On the other hand, in the last half of the carrier cycle, the selector 32 selects three analog signals from among the seven inputted analog signals in a manner as shown in FIG. 7B. As a result, in the first half of the carrier cycle, a U-phase motor current Iu is inputted to the AD converter 21, a V-phase motor current Iv is inputted to the AD converter 22, and a power supply voltage Vs is inputted to the AD converter 23. Also, in the last half of the carrier cycle, the U-phase motor current Iu is inputted to the AD converter 21, a U-phase motor voltage Vu instead of the V-phase motor current Iv is inputted to the AD converter 22, and the power supply voltage Vs is inputted to the AD converter 23. Note that, as shown in FIG. 7C, while the motor 41 is stopped, a first temperature sensor output T1 is inputted to the AD converter 21, and a second temperature sensor output T2 is inputted to the AD converter 22.

Figure 8:
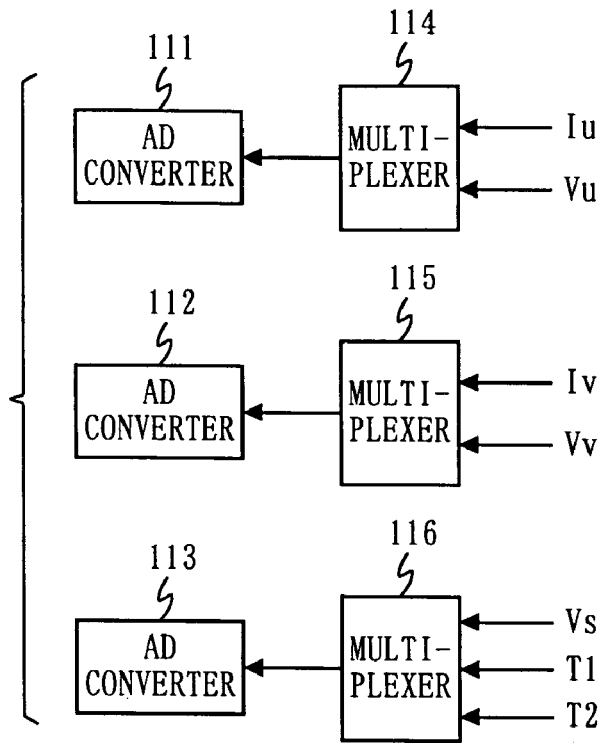
FIG. 8 is an illustration showing analog signal selection in a conventional inverter control microcomputer.
Figure 9:
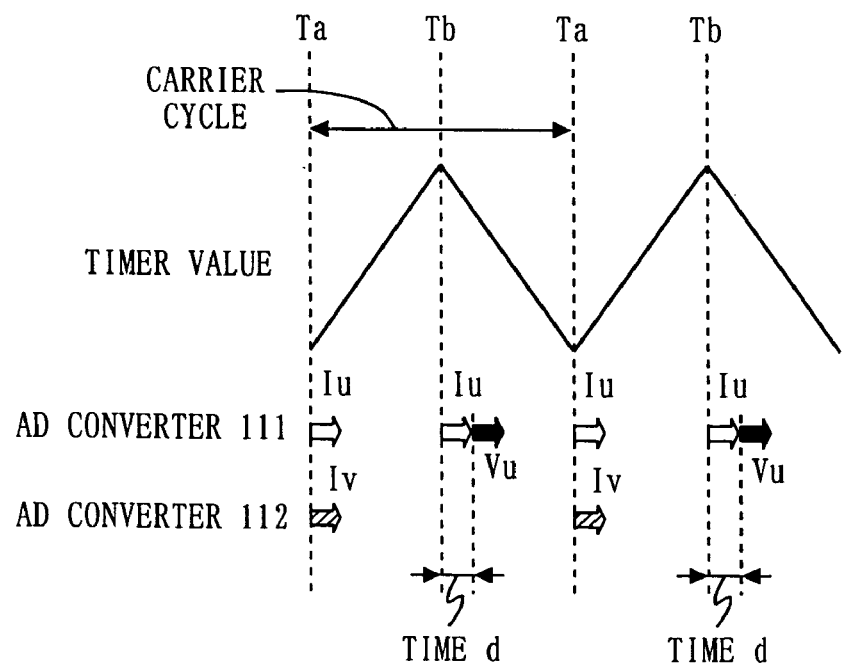
FIG. 9 is an AD conversion timing chart of the conventional inverter control microcomputer.

Hereinafter, an effect of the inverter control microcomputer 10 according to the present embodiment will be described. FIG. 8 is an illustration showing analog signal selection in a conventional inverter control microcomputer. FIG. 8 shows a configuration for selecting three analog signals from among seven analog signals using three multiplexers 114 to 116 which select one output from two inputs. In the configuration as shown in FIG. 8, a U-phase motor current Iu or a U-phase motor voltage Vu is inputted to the AD converter 111, a V-phase motor current Iv or a V-phase motor voltage Vv is inputted to the AD converter 112, and a power supply voltage Vs, a first temperature sensor output T1, or a second temperature sensor output T2 is inputted to the AD converter 113. The inverter control microcomputer having a configuration as shown in FIG. 8 is able to perform AD conversion concurrently for the U-phase motor current Iu and the V-phase motor current Iv, but unable to perform AD conversion concurrently for the U-phase motor current Iu and the U-phase motor voltage Vu. Thus, as shown in FIG. 9, in order to detect the U-phase motor current Iu and the U-phase motor voltage Vu, the AD converter 111 is required to perform AD conversion for the U-phase motor voltage Vu after performing AD conversion for the U-phase motor current Iu.

However, AD conversion by the AD converters 111 to 113 takes a predetermined time d. Thus, the inverter control microcomputer having the configuration as shown in FIG. 8 is unable to perform AD conversion for the U-phase motor current Iu and the U-phase motor voltage Vu at the same time. That is, the U-phase motor current Iu at a time t and the U-phase motor voltage Vu at the same time t should be ideally detected. In practice, however, the U-phase motor current Iu at the time t and the U-phase motor voltage Vu at a time (t+d) could be detected at best. In the case where a time d required for AD conversion is 2.5 microseconds, for example, the U-phase motor voltage Vu is AD converted with a time lag of 2.5 microseconds after the U-phase motor current Iu is AD converted. A motor current and a motor voltage fluctuate significantly with the passage of time, whereby an error occurs in the detected motor voltage in the inverter control microcomputer having the configuration as shown in FIG. 8. As a result, it is impossible to control the motor 41 with high precision.

For instance, assume that a six-pole motor is driven at 100 rps (100 rotations per second). In this case, the electric frequency is 300 Hz, that is, a time required for one rotation is 3.333 milliseconds (1/300 seconds). Under the above conditions, assume that, as described above, there is a time lag of 2.5 microseconds between an AD conversion time of the U-phase motor current Iu and an AD conversion time of the U-phase motor voltage Vu. In this case, a 0.27-degree out-of-phase U-phase motor voltage Vu is detected.

In this case, it is possible to adjust an output value of the AD converter by taking into account the fact that a time lag occurs when AD conversion is performed. For example, if the assumption is made that a voltage value has a sinusoidal waveform, an adjusted value of a voltage outputted from the AD converter can be estimated based on an amplitude, a frequency, and a delay time, etc. In practice, however, the voltage value does not have a sinusoidal waveform in many cases due to influences of disturbance, etc. Also, it is very difficult to obtain an accurate adjusted value by the above-described method while the motor is being accelerated or decelerated.

Figure 10:
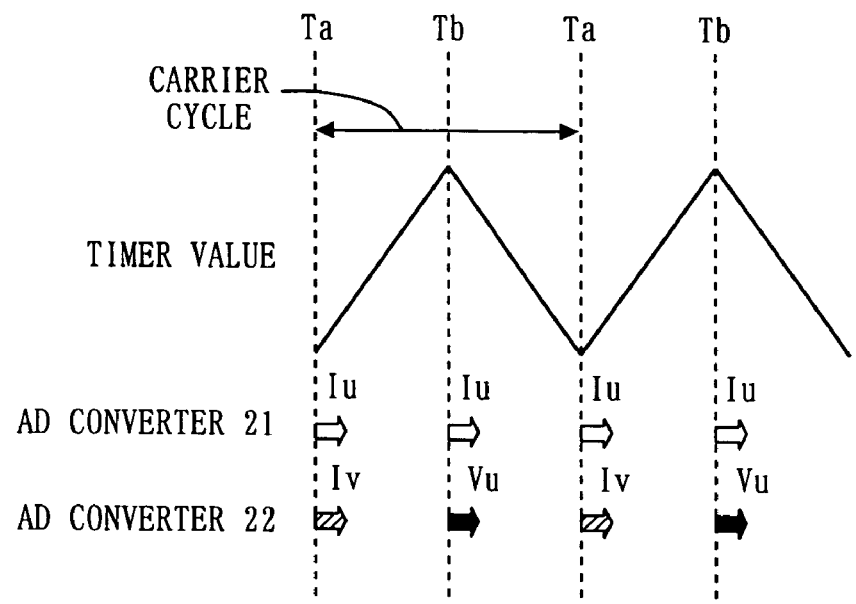
FIG. 10 is an AD conversion timing chart of the inverter control microcomputer as shown in FIG. 1.

On the other hand, in the inverter control microcomputer 10 according to the present embodiment, AD conversion is performed at a timing as shown in FIG. 10. That is, at a time Ta as shown in FIG. 10, the selector 32 selects, as shown in FIG. 7A, a U-phase motor current Iu as an input to the AD converter 21 and a V-phase motor current Iv as an input to the AD converter 22. As a result, by the AD converters 21 and 22, the U-phase motor current Iu and the V-phase motor current Iv are concurrently detected. After the above detection is performed, a position of the rotator of the motor 41 is estimated based on the detected U-phase motor current Iu and V-phase motor current Iv (step S101 in FIG. 6). Also, at a time Tb as shown in FIG. 10, the selector 32 selects, as shown in FIG. 7B, a U-phase motor current Iu as an input to the AD converter 21 and a U-phase motor voltage Vu as an input to the AD converter 22. As a result, by the AD converters 21 and 22, the U-phase motor current Iu and the U-phase motor voltage Vu are concurrently detected. After that, a load on the motor 41 is estimated based on the detected U-phase motor current Iu and U-phase motor voltage Vu (step S102 in FIG. 6), and an output voltage is calculated based on the estimated position and load (step S103 in FIG. 6).

As such, in the conventional inverter control microcomputer as shown in FIG. 8, an out of phase U-phase motor voltage Vu is detected. On the other hand, in the inverter control microcomputer 10 according to the present embodiment, a U-phase motor voltage Vu with no phase shift is detected. Furthermore, even if a signal waveform is distorted by disturbance or even while the motor is being accelerated or decelerated, the inverter control microcomputer 10 according to the present embodiment can detect signals accurately. Thus, with the inverter control microcomputer 10 according to the present embodiment, it is possible to perform control of the motor 41 with high precision. In general, with an inverter control microcomputer having a selector for selecting arbitrary N analog signals from among M analog signals, it is possible to perform control of a motor with high precision by eliminating a phase shift, which is produced by the conventional inverter control microcomputer at the time of AD conversion.

Also, as described above, in the inverter control microcomputer 10, an AD converter having a lower performance compared to the AD converters 21 and 22 is used as the AD converter 23. In general, in order to perform motor control, AD conversion should be performed at high speed with high precision. Thus, while the motor 41 is rotating, as shown in FIGS. 7A and 7B, the AD converters 21 and 22 are used for motor control, and the AD converter 23 is used for AD conversion of other analog signal (in FIGS. 7A and 7B, a power supply voltage Vs). On the other hand, while the motor 41 is stopped, AD conversion for motor control is not needed. Thus, while the motor 41 is stopped, as shown in FIG. 7C, the AD converter 21 is used for AD conversion of a first temperature sensor output T1, and the AD converter 22 is used for AD conversion of a second temperature sensor output T2. As a result, with the inverter control microcomputer 10 according to the present embodiment, it is possible to perform AD conversion for the temperature sensor outputs T1 and T2 at high speed with high precision while the motor is stopped.

In order to perform AD conversion for a temperature sensor output, etc., at high speed with high precision in the conventional inverter control microcomputer, all AD converters included in the inverter control microcomputer should be operated at high speed with high precision. Thus, a chip area of the inverter control microcomputer is increased, whereby a cost thereof is also increased. On the other hand, with the inverter control microcomputer 10 according to the present embodiment, even if a relatively low-speed and low-precision AD converter is used as the AD converter 23, it is possible to perform AD conversion for the temperature sensor outputs T1 and T2 at high speed with high precision.

Note that, in the above description, it is assumed that the selector 32 selects analog signals as shown in FIG. 7C when the motor 41 is stopped. However, even while the motor 41 is rotating, the selector 32 may select the analog signals as shown in FIG. 7C in the intervals between times at which AD conversion for motor control is performed.

As described above, with the inverter control device according to the present embodiment, it is possible to detect an analog signal necessary for motor control at an appropriate timing, and perform motor control with high precision. Also, by using AD converters of varying performance, it is possible to select an AD converter most suitable for an inputted analog signal, and perform high-precision AD conversion without increasing costs.

Note that, in the above description, it is assumed that the selector 32 selects arbitrary three output signals from among seven input signals. However, certain limitations maybe imposed on signal selection performed by the selector 32. For example, six or fewer input signals may be previously chosen for each output signal, and each output signal may be selected from among the previously chosen input signals. Alternatively, two output signals may be previously chosen for each input signal, and each input signal may be outputted as any of the two previously chosen output signals.

Figure 11:
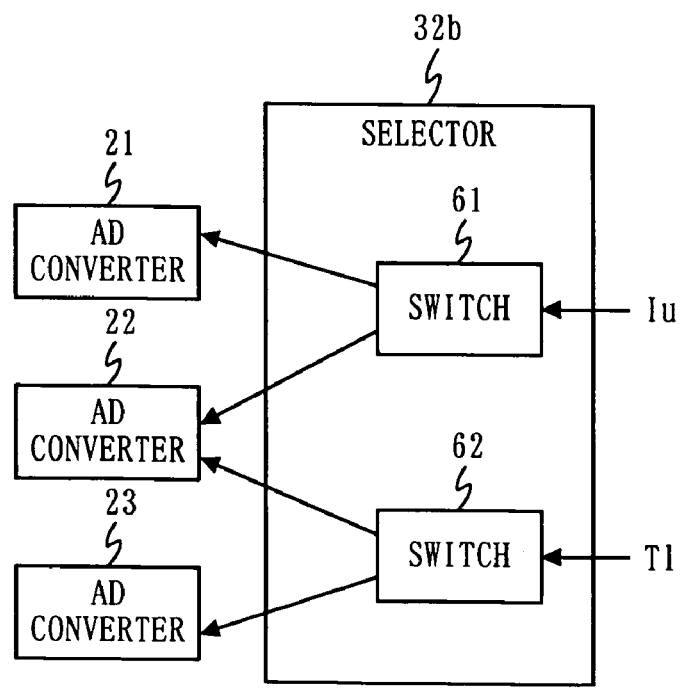
FIG. 11 is an illustration showing a detailed configuration (second configuration) of the selector included in the inverter control microcomputer as shown in FIG. 1.

In this case, exemplary details of the selector 32 are shown in FIG. 11. As is the case with the selector 32a as shown in FIG. 3, a selector 32b as shown in FIG. 11 includes seven switches corresponding to seven input signals. However, each switch is connected to only two AD converters of the three AD converters 21 to 23, and each switch is controlled so as to output the input signal to one of the two AD converters, output to the other AD converter, or output no signal to any of the two AD converters. Note that, for simplification of the drawing, only a switch 61 for switching an output destination of the U-phase motor current Iu and a switch 62 for switching an output destination of the first temperature sensor output T1 are shown in FIG. 11, and other five switches are omitted.

By the above-described selector 32b, it is possible to perform AD conversion of the U-phase motor current Iu by the AD converter 21 or 22, and perform AD conversion of the first temperature sensor output T1 by the AD converter 22 or 23. Also, a circuit size of the selector 32b is smaller than that of the selector 32a (FIG. 3) which outputs an arbitrary input signal to an arbitrary AD converter. Note that the selector 32b is unable to output a U-phase motor current Iu to the AD converter 23. However, it makes no practical difference since, as described above, AD conversion should be performed at high speed with high precision when motor control is performed.

As described above, by using the above-described selector, although a combination of signals for which AD conversion is concurrently performed is limited, it is possible to reduce a circuit size compared to a case in which a selector for outputting an arbitrary input signal to an arbitrary AD converter is used.

Second Embodiment

Figure 12:
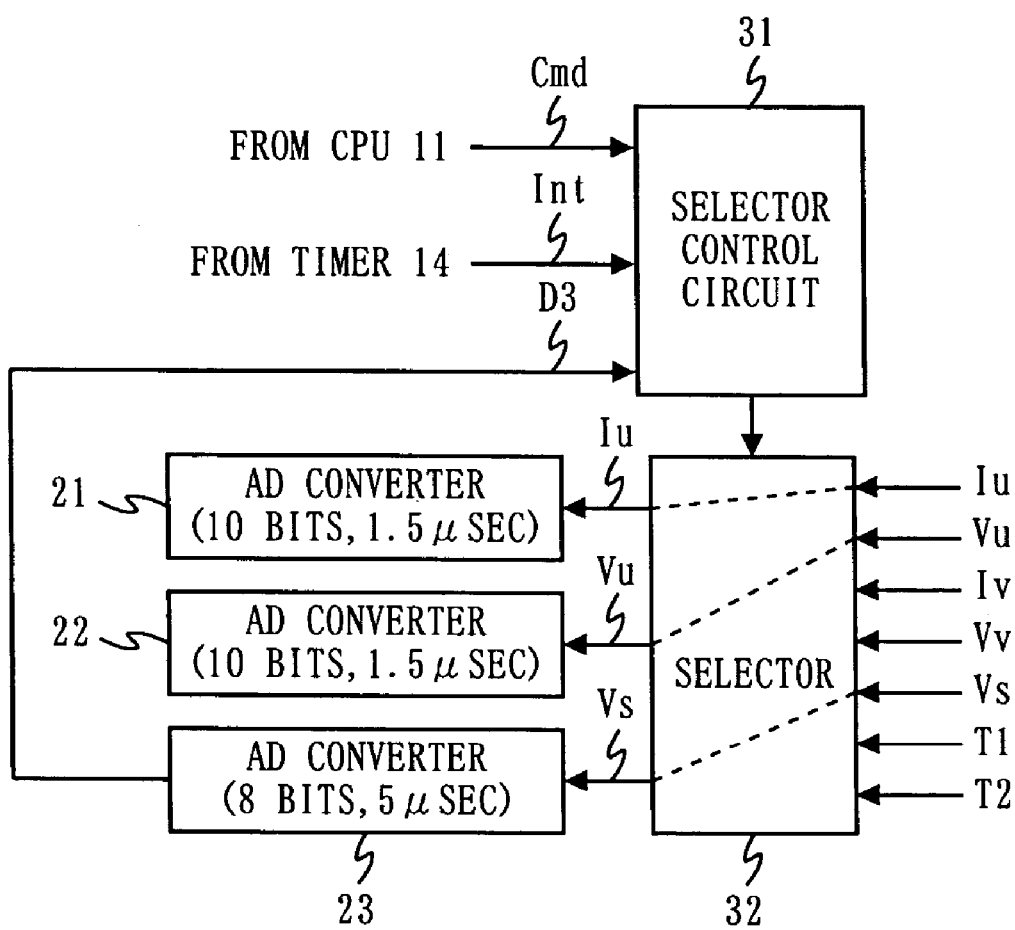
FIG. 12 is an illustration showing a configuration of an inverter control microcomputer according to a second embodiment of the present invention.

In a second embodiment, with reference to FIG. 12, an input signal of the selector control circuit 31 will be described. Hereinafter, any component elements that have similar counter parts in the first embodiment will be denoted by the same reference numerals as those used therein, and the description thereof is omitted. As shown in FIG. 12, a command signal Cmd outputted from the CPU 11, an interrupt signal Int outputted from the timer 14, and a digital value D3 obtained by the AD converter 23 are inputted to the selector control circuit 31 as input signals.

As described in the first embodiment, the selector 32 selects arbitrary three analog signals from among inputted seven analog signals in accordance with control from the selector control circuit 31. In this case, analog signal selection performed by the selector 32 may be changed in accordance with a driving state or a control state of the motor 41. The driving state or the control state of the motor 41 can be detected by software executed by the CPU 11. Thus, when software for performing inverter control is executed, the CPU 11 outputs, if necessary, a command signal Cmd to the selector control circuit 31. The selector control circuit 31 changes analog signal selection performed by the selector 32 in accordance with the command signal Cmd outputted from the CPU 11. As a result, it is possible to change analog signal selection performed by the selector 32 at an appropriate timing in accordance with the driving state or the control state of the motor 41.

Also, in the case where a motor control algorithm (e.g., an algorithm as shown in FIG. 6) is executed according to a predetermined cycle, analog signal selection performed by the selector 32 may be changed based on an interrupt signal Int outputted from the timer 14 according to a predetermined cycle. In this case, the interrupt signal Int is outputted from the timer 14 according to a predetermined cycle (e.g., half of a carrier cycle) The selector control circuit 31 changes analog signal selection performed by the selector 32 in accordance with the interrupt signal Int outputted from the timer 14.

In the conventional inverter control microcomputer, an interrupt signal outputted from the timer 14 is inputted to the CPU 11, and a process for changing analog signal selection is executed by software during an interrupt processing routine of the CPU 11. On the other hand, in the inverter control microcomputer according to the present embodiment, when the interrupt signal Int is outputted from the timer 14, analog signal selection is automatically changed by the selector control circuit 31. Thus, it is possible to change analog signal selection performed by the selector 32 without increasing a software processing load on the CPU.

Also, the algorithm for controlling the motor 41 may be changed in accordance with a driving state of the motor 41. For example, the inverter control microcomputer 10 may adopt a motor control algorithm by which two processes (the first one for estimating a position of the rotator by detecting two-phase motor currents, and the second one for estimating a load by concurrently detecting a motor current and a motor voltage which are in phase) are alternately performed (see FIG. 10) in order to quickly follow a load change when a heavy load is imposed on the motor 41, and only the first process is performed when a light load is imposed on the motor 41.

In the inverter control microcomputer 10 according to the present embodiment, analog signal selection performed by the selector 32 is changed in accordance with the digital value D3 obtained by the AD converter 23. Thus, it is possible to change analog signal selection performed by the selector 32 without increasing a software processing load on the CPU. Note that, in this case, the selector control circuit 31 may compare the digital value D3 obtained by the AD converter 23 with a pre-set threshold value, and change analog signal selection performed by the selector 32 based on the comparison results.

Figure 13:
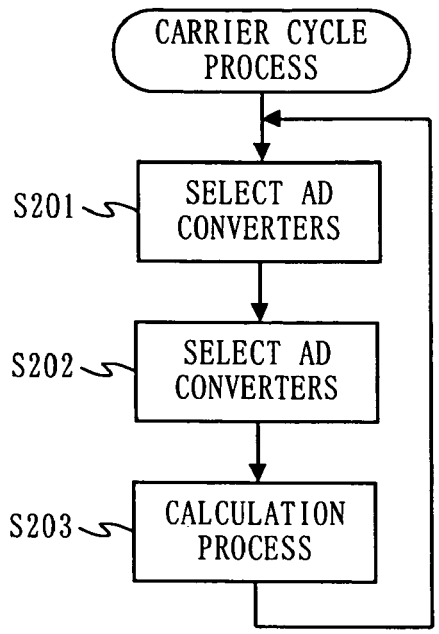
FIG. 13 is a flowchart showing a carrier cycle process of the inverter control microcomputer according to the second embodiment of the present invention.

FIG. 13 is a flowchart showing a carrier cycle process of the inverter control microcomputer according to the present embodiment. In the inverter control microcomputer according to the present embodiment, steps S201 to S203 as shown in FIG. 13 are performed in each carrier cycle. An AD converter selection process is first performed twice in each carrier cycle (steps S201 and S202), and a predetermined calculation process is performed (step S203). At steps S201 and S202, as described above, analog signal selection performed by the selector 32 is changed at the regular time intervals or in accordance with the calculation results. The inverter control microcomputer according to the present embodiment automatically performs an AD converter selection process by the hardware at steps S201 and S202, whereby it is not necessary to perform the AD converter selection process by software.

In general, as shown in FIGS. 9 and 10, in the motor inverter control, an AD conversion process and a calculation process based on the AD conversion results are repeatedly performed every carrier cycle. If the sum of processing times of the AD conversion process and the calculation process exceeds the carrier cycle, however, it is impossible to configure the motor control device in an appropriate manner. Thus, when the specifications of the inverter control microcomputer are determined, the sum of the above processing times should not exceed the carrier cycle. In the case where the sum of the above processing times exceeds the carrier cycle, the CPU speed has to be increased, for example. However, when the CPU speed is increased, a cost of the inverter control microcomputer is significantly increased.

On the other hand, with the inverter control microcomputer 10 according to the present embodiment, it is possible to change analog signal selection performed by the selector 32 in accordance with each timing without increasing a software processing load on the CPU. Thus, it is possible to significantly reduce the amount of software processing, although a cost is slightly increased. As a result, it is possible to perform motor control with high precision, even if the low-speed and low-cost CPU 11 is used.

It has been described that the inverter control microcomputer dynamically changes analog signal selection during the motor control. However, it is also effective that the inverter control microcomputer statically changes analog signal selection while the motor is stopped. For example, if the inverter control microcomputer performs a device type switching process as shown in FIG. 14 while the motor is stopped, it is possible to realize a motor control device which performs relatively high-precision AD conversion for an analog input signal Vx (hereinafter referred to as a device A) and a motor control device which performs relatively low-precision AD conversion for the analog input signal Vx (hereinafter referred to as a device B) by using the same inverter control microcomputer.

Figure 14:
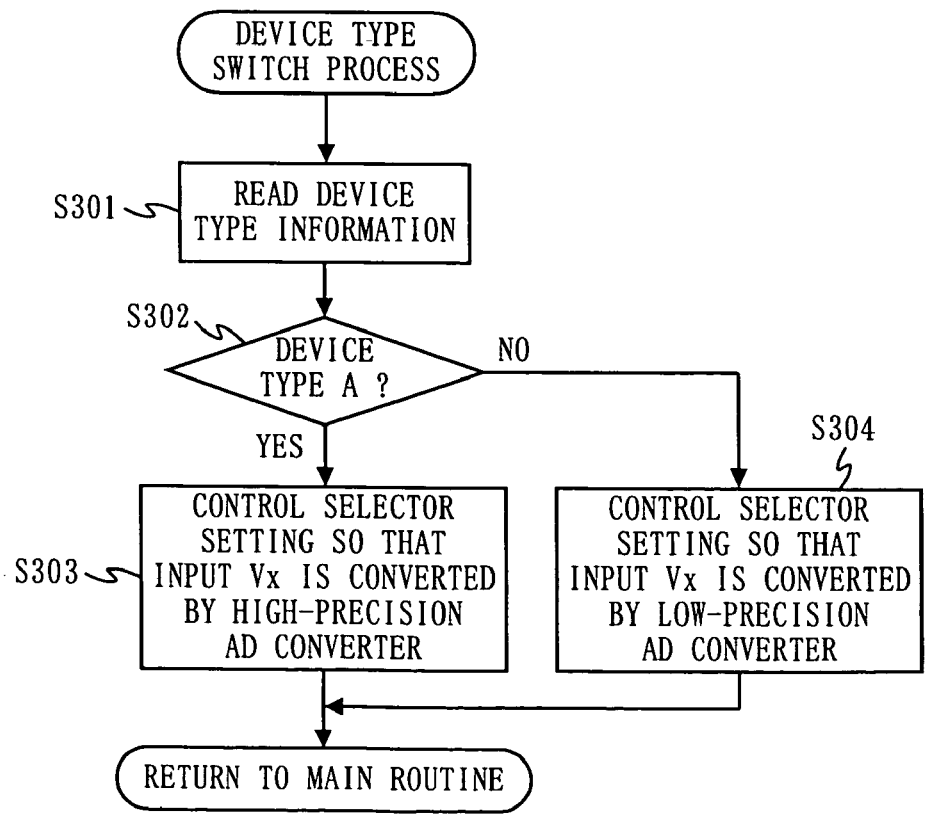
FIG. 14 is a flowchart showing a device type switching process of the inverter control microcomputer according to the second embodiment of the present invention.
Figure 15A:
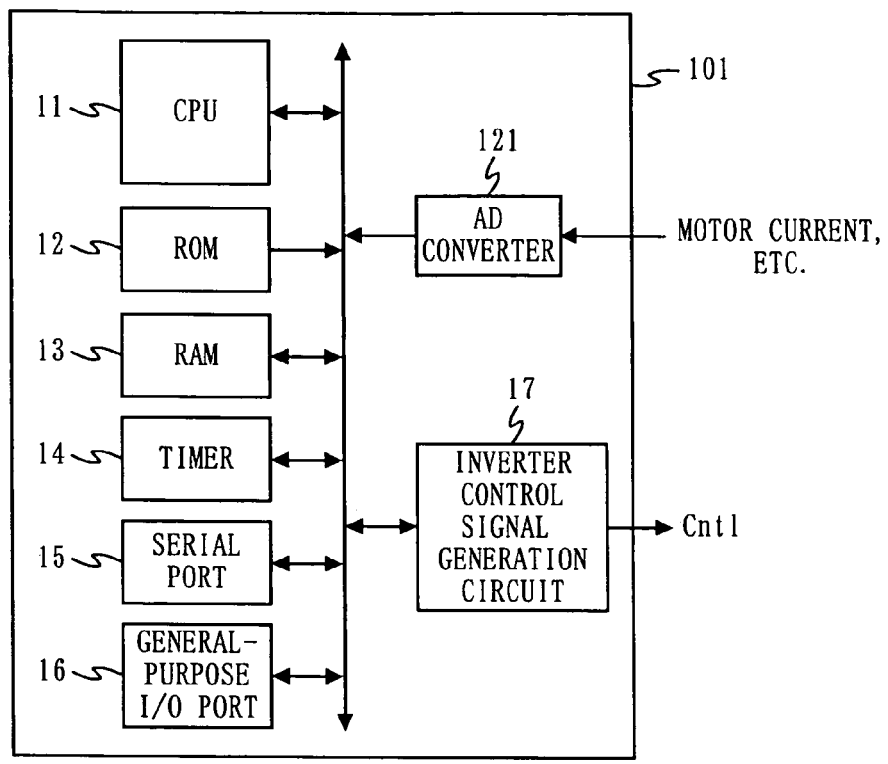
FIGS. 15A and 15B are illustrations each showing a configuration of a conventional inverter control microcomputer.
Figure 15B:
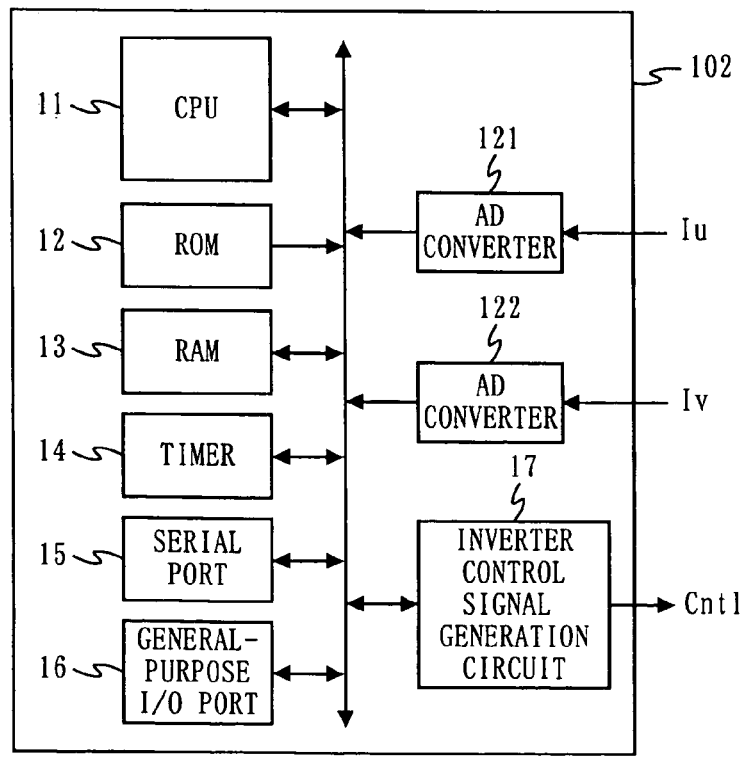
Figure 16:
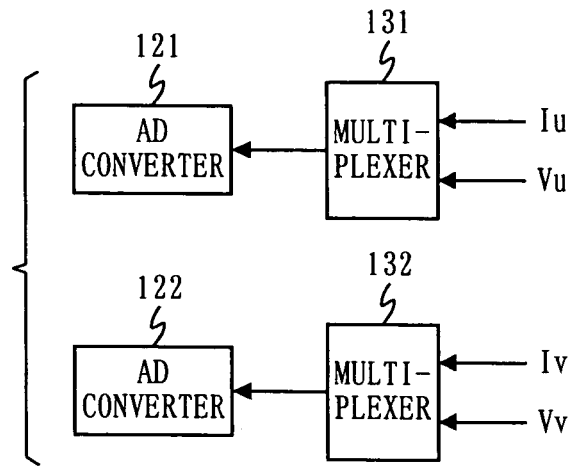
FIG. 16 is an illustration showing analog signal selection in a conventional inverter control microcomputer.
Figure 17:
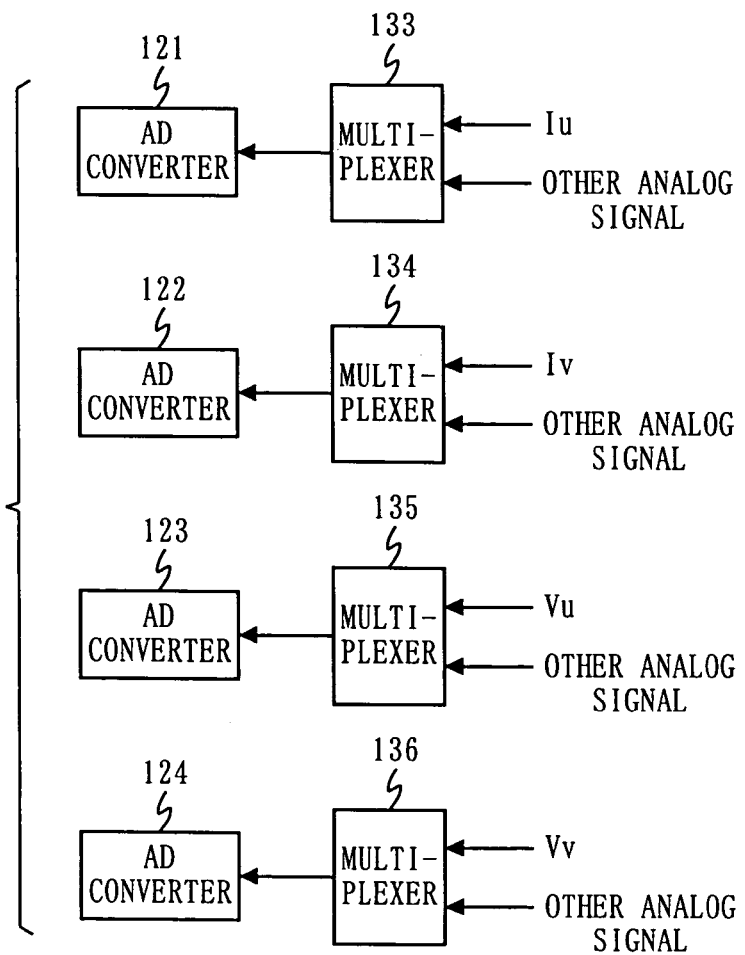
FIG. 17 is an illustration showing analog signal selection in a conventional inverter control microcomputer.

In the device type switching process as shown in FIG. 14, the inverter control microcomputer first reads device type information (step S301). For example, at step S301, the inverter control microcomputer may read device type information stored in an external EEPROM, or may read device type information set by using an on-board jumper wire or a DIP switch via an input/output port. Next, the inverter control microcomputer determines whether or not the read device type information indicates a device A (step S302). When the read device type information indicates a device A, the inverter control microcomputer proceeds to step S303. Otherwise, the inverter control microcomputer proceeds to step S304. In the former case, the inverter control microcomputer controls the settings of the selector so that an analog input signal Vx is AD converted by a relatively high-precision AD converter (step S303). In the latter case, the inverter control microcomputer controls the settings of the selector so that the analog input signal is AD converted by a relatively low-precision AD converter (step S304). Then, the control of the inverter control microcomputer returns to a main routine.

In the case where a plurality of types of motor control devices are developed by using the conventional inverter control microcomputer, it is necessary to use a different microcomputer for each device, or configure a different printed circuit board for each device. On the other hand, when the inverter control microcomputer according to the present embodiment performs the device type switching process as shown in FIG. 14, it is possible to realize the device A and the device B by using the same inverter control microcomputer and the same printed circuit board. As a result, it is possible to reduce a cost of development and manufacturing of a plurality of types of motor control devices.

Note that, it has been described that the different types of devices require different degrees of precision of AD conversion. However, the aforementioned method can be applied to a case in which the different types of devices have different combinations of analog input signals to be concurrently converted.

Note that, in the above described embodiments, the inverter control microcomputer has been described as one example. However, it will be understood that other semiconductor devices such as a DSP incorporating AD converters can comprise the same inverter control device, with which the same effect can be obtained.

Also, in the above-described embodiments, a case in which an object to be controlled is a motor has been described as one example. However, it will be understood that the same effect can be obtained by using the same method even if an object to be controlled is an arbitrary load driven by inverter control for generating the alternate current from the direct current.

Also, in the above-described embodiments, the inverter control microcomputer incorporating three AD converters has been described as one example. However, it will be understood that the inverter control microcomputer may incorporate N (N is an integer equal to or greater than three) AD converters. In the inverter control microcomputer incorporating N AD converters, a selector is required to select N analog signals from among inputted M (M is an integer greater than N) analog signals. In this case, the selector may select arbitrary N analog signals from among the inputted M analog signals. Alternatively, L (L is an integer smaller than N) analog signals included in the N analog signals may be previously determined for each of the inputted M analog signals, and the selector may output each of the inputted M analog signals as any of the analog signals which are previously-determined for each of the inputted M analog signals.

The inverter control device and the inverter control method of the present invention can detect an analog signal used for control of a motor, etc., at an appropriate timing without increasing the number of AD converters. Thus, it is possible to use the inverter control device and the inverter control method of the present invention for controlling a motor, etc., for which control should be performed while switching an input signal.

While the invention has been described in detail, the foregoing description is in all aspects illustrative and not restrictive. It is understood that numerous other modifications and variations can be devised without departing from the scope of the invention.

What is claimed is:

1. An inverter control device for generating a control signal for an object to be controlled based on a plurality of input analog signals, comprising:
   a selection section for selecting N analog signals from among M input analog signals;
   N AD converters for converting the N analog signals selected by the selection section to N digital values; and
   a control signal generation section for generating a control signal for an object to be controlled based on the N digital values obtained by the N AD converters, wherein
   L analog signals included in the N analog signals are previously chosen for each of the M analog signals,
   the selection section outputs each of the M analog signals as any of the analog signals which are previously chosen for each of the M analog signals,
   M is an integer equal to or greater than four,
   N is an integer equal to or greater than three and smaller than M, and
   L is an integer smaller than N.

2. The inverter control device according to claim 1, further comprising a selection control section for controlling analog signal selection performed by the selection section.

3. The inverter control device according to claim 2, wherein the selection control section changes analog signal selection performed by the selection section in accordance with an instruction outputted from a CPU included in the control signal generation section.

4. The inverter control device according to claim 2, wherein the selection control section changes analog signal selection performed by the selection section in accordance with a digital value obtained by at least one AD converter of the N AD converters.

5. The inverter control device according to claim 2, wherein the selection control section changes analog signal selection performed by the selection section while the object is controlled.

6. The inverter control device according to claim 2, wherein the selection control section changes analog signal selection performed by the selection section based on device type information before the object is controlled.

7. The inverter control device according to claim 1, wherein performance of at least one AD converter of the N AD converters is different from performance of other AD converters.

8. The inverter control device according to claim 7, wherein performance of at least one AD converter of the N AD converters is lower than performance of other AD converters.

9. An inverter control method for generating a control signal for an object to be controlled based on a plurality of input analog signals, comprising the steps of:
   selecting N analog signals from among M input analog signals;
   AD-converting the selected N analog signals to N digital values; and
   generating a control signal for an object to be controlled based on the obtained N digital values, wherein
   L analog signals included in the N analog signals are previously chosen for each of the M analog signals,
   the selecting step outputs each of the M analog signals as any of the analog signals which are previously chosen for each of the M analog signals,
   M is an integer equal to or greater than four,
   N is an integer equal to or greater than three and smaller than M, and
   L is an integer smaller than N.

10. The inverter control method according to claim 9, further comprising a step of controlling the analog signal selection.

11. The inverter control method according to claim 10, wherein the selection controlling step changes the analog signal selection in accordance with an instruction outputted from a CPU.

12. The inverter control method according to claim 10, wherein the selection controlling step changes the analog signal selection in accordance with a timer interrupt which occurs at a predetermined cycle.

13. The inverter control method according to claim 10, wherein the selection controlling step changes the analog signal selection in accordance with a digital value obtained by conversion of at least one analog signal of the N analog signals.

14. The inverter control method according to claim 10, wherein the selection controlling step compares a digital value obtained by conversion of at least one analog signal of the N analog signals with a previously determined threshold value, and changes the analog signal selection based on the comparison results.

15. The inverter control method according to claim 10, wherein the selection controlling step changes the analog signal selection while the object is controlled.

16. The inverter control method according to claim 10, wherein the selection controlling step changes the analog signal selection based on device type information before the object is controlled.

17. The inverter control method according to claim 10, wherein
   the M analog signals include at least two-phase currents and at least one-phase voltage, and
   the selection controlling step switches the analog signal selection between a first selection mode in which two-phase currents are separately converted to digital signals and a second selection mode in which one-phase current and one-phase voltage are separately converted to digital signals.

18. The inverter control method according to claim 17, wherein the selection controlling step switches the analog signal selection between the first and second selection modes based on a periodic signal which occurs at a predetermined cycle.

19. The inverter control method according to claim 17, wherein the selection controlling step switches the analog signal selection between the first and second selection modes in accordance with a digital value obtained by conversion of at least one analog signal of the N analog signals.

20. The inverter control method according to claim 19, wherein the selection controlling step compares a digital value obtained by conversion of at least one analog signal of the N analog signals with a previously determined threshold value, and switches the analog signal selection between the first and second selection modes based on the comparison results.

21. The inverter control method according to claim 9, wherein the AD-converting step converts at least one analog signal of the N analog signals to a digital value with a precision that is different from a precision with which other analog signals are converted.

22. The inverter control method according to claim 21, wherein the AD-converting step converts at least one analog signal of the N analog signals to a digital value with a precision that is lower than a precision with which other analog signals are converted.

23. The inverter control method according to claim 22, wherein
the M analog signals include a load current, and
the selection controlling step switches the analog signal selection between a first selection mode in which the load current is converted to a digital value with relatively high precision and a signal other than the load current is converted to a digital value with relatively low precision, and a second selection mode in which a part of the signals other than the load current is converted to a digital value with relatively high precision and another part of the signals other than the load current is converted to a digital value with relatively low precision.

24. The inverter control method according to claim 23, wherein the selection controlling step switches the analog signal selection to the first selection mode when the object is controlled, and otherwise to the second selection mode.

25. An inverter control device for generating a control signal for an object to be controlled based on a plurality of input analog signals, comprising:
a selection section for selecting N analog signals from among M input analog signals;
N AD converters for converting the N analog signals selected by the selection section to N digital values;
a control signal generation section for generating a control signal for an object to be controlled based on the N digital values obtained by the N AD converters; and
a selection control section for controlling analog signal selection performed by the selection section, wherein:
the selection control section changes analog signal selection performed by the selection section in accordance with a timer interrupt which occurs at a predetermined cycle,
M is an integer equal to or greater than four, and
N is an integer equal to or greater than three and smaller than M.

26. An inverter control device for generating a control signal for an object to be controlled based on a plurality of input analog signals, comprising:
a selection section for selecting N analog signals from among M input analog signals;
N AD converters for converting the N analog signals selected by the selection section to N digital values;
a control signal generation section for generating a control signal for an object to be controlled based on the N digital values obtained by the N AD converters; and
a selection control section for controlling analog signal selection performed by the selection section, wherein:
the selection control section compares a digital value obtained by at least one AD converter of the N AD converters with a previously determined threshold value, and changes analog signal selection performed by the selection section based on the comparison results,
M is an integer equal to or greater than four, and
N is an integer equal to or greater than three and smaller than M.

27. An inverter control device for generating a control signal for an object to be controlled based on a plurality of input analog signals, comprising:
a selection section for selecting N analog signals from among M input analog signals;
N AD converters for converting the N analog signals selected by the selection section to N digital values;
a control signal generation section for generating a control signal for an object to be controlled based on the N digital values obtained by the N AD converters; and
a selection control section for controlling analog signal selection performed by the selection section, wherein
the M analog signals include at least two phase currents and at least one phase voltage,
the selection control section switches analog signal selection performed by the selection section between a first mode in which two phase currents are output to different AD converters and a second mode in which one phase current and one phase voltage are output to different AD converters,
M is an integer equal to or greater than four, and
N is an integer equal to or greater than three and smaller than M.

28. The inverter control device according to claim 27, wherein the selection control section switches analog signal selection performed by the selection section between the first and second modes based on a periodic signal which occurs at a predetermined cycle.

29. The inverter control device according to claim 27, wherein the selection control section switches analog signal selection performed by the selection section between the first and second modes in accordance with a digital value obtained by at least one AD converter of the N AD converters.

30. The inverter control device according to claim 29, wherein the selection control section compares a digital value obtained by at least one AD converter of the N AD converters with a previously determined threshold value, and switches analog signal selection performed by the selection section between the first and second modes based on the comparison results.

31. An inverter control device for generating a control signal for an object to be controlled based on a plurality of input analog signals, comprising:
a selection section for selecting N analog signals from among M input analog signals;
N AD converters for converting the N analog signals selected by the selection section to N digital values; and
a control signal generation section for generating a control signal for an object to be controlled based on the N digital values obtained by the N AD converters, wherein
performance of at least one AD converter of the N AD converters is lower than performance of other AD converters, the M analog signals include a load current,
the selection control section switches analog signal selection performed by the selection section between a first mode in which the load current is output to a relatively high-performance AD converter and a signal other than the load current is output to a relatively low-performance AD converter, and a second mode in which a part of the signals other than the load current is output to the relatively high-performance AD converter and another part of the signals other than the load current is output to the relatively low-performance AD converter,
M is an integer equal to or greater than four, and
N is an integer equal to or greater than three and smaller than M.

32. The inverter control device according to claim 31, wherein the selection control section switches analog signal selection performed by the selection section to the first mode when the object is controlled, and otherwise to the second mode.

33. An inverter control device for generating a control signal for an object to be controlled based on a plurality of input analog signals, comprising:
a selection section for selecting N analog signals from among M input analog signals and for outputting each of the M analog signals as any of the N analog signals;
N AD converters for converting the N analog signals selected by the selection section to N digital values; wherein
N is an integer equal to or greater than three and smaller than M, and M is an integer equal to or greater than four.

34. The inverter control device according to claim 33, wherein
L analog signals included in the N analog signals are previously chosen for each of the M analog signals, and
the selection section outputs each of the M analog signals as any of the analog signals which are previously chosen for each of the M analog signals, wherein
L is an integer smaller than N.

35. The inverter control device according to claim 33, further comprising a selection control section for controlling analog signal selection performed by the selection section.

36. The inverter control device according to claim 35, wherein the selection control section changes analog signal selection performed by the selection section in accordance with an instruction output from a CPU included in the control signal generation section.

37. The inverter control device according to claim 35, wherein the selection control section changes analog signal selection performed by the selection section in accordance with a timer interrupt which occurs at a predetermined cycle.

38. The inverter control device according to claim 35, wherein the selection control section changes analog signal selection performed by the selection section in accordance with a digital value obtained by at least one AD converter of the N AD converters.

39. The inverter control device according to claim 35, wherein the selection control section compares a digital value obtained by at least one AD converter of the N AD converters with a previously determined threshold value, and changes analog signal selection performed by the selection section based on the comparison results.

40. The inverter control device according to claim 35, wherein the selection control section changes analog signal selection performed by the selection section while the object is controlled.

41. The inverter control device according to claim 35, wherein the selection control section changes analog signal selection performed by the selection section based on device type information before the object is controlled.

42. The inverter control device according to claim 35, wherein
the M analog signals include at least two-phase currents and at least one-phase voltage, and
the selection control section switches analog signal selection performed by the selection section between a first mode in which two-phase currents are output to different AD converters and a second mode in which one-phase current and one-phase voltage are output to different AD converters.

43. The inverter control device according to claim 42, wherein the selection control section switches analog signal selection performed by the selection section between the first and second modes based on a periodic signal which occurs at a predetermined cycle.

44. The inverter control device according to claim 42, wherein the selection control section switches analog signal selection performed by the selection section between the first and second modes in accordance with a digital value obtained by at least one AD converter of the N AD converters.

45. The inverter control device according to claim 44, wherein the selection control section compares a digital value obtained by at least one AD converter of the N AD converters with a previously determined threshold value, and switches analog signal selection performed by the selection section between the first and second modes based on the comparison results.

46. The inverter control device according to claim 33, wherein performance of at least one AD converter of the N AD converters is different from performance of other AD converters.

47. The inverter control device according to claim 46, wherein performance of at least one AD converter of the N AD converters is lower than performance of other AD converters.

48. The inverter control device according to claim 47, wherein
the M analog signals include a load current, and
the selection control section switches analog signal selection performed by the selection section between a first mode in which the load current is output to a relatively high-performance AD converter and a signal other than the load current is output to a relatively low-performance AD converter, and a second mode in which a part of the signals other than the load current is output to the relatively high-performance AD converter and another part of the signals other than the load current is output to the relatively low-performance AD converter.

49. The inverter control device according to claim 48, wherein the selection control section switches analog signal selection performed by the selection section to the first mode when the object is controlled, and otherwise to the second mode.

50. An inverter control device for generating a control signal for an object to be controlled based on a plurality of input analog signals, comprising:
a selection section for selecting N analog signals from among M input analog signals; and N AD converters for converting the N analog signals selected by the selection section to N digital values, wherein
the selection section outputs each of the M analog signals as an input of a first AD converter of N AD converters in a first mode and as an input of a second AD converter of the N AD converters in a second mode; and N is an integer equal to or greater than three and smaller than M, and M is an integer equal to or greater than four.

* * * * *